(12) United States Patent
Hung et al.

(10) Patent No.: US 11,321,439 B2
(45) Date of Patent: May 3, 2022

(54) IDENTITY AUTHENTICATION SYSTEM AND METHOD THEREOF

(71) Applicant: Chunghwa Telecom Co., Ltd., Taoyuan (TW)

(72) Inventors: Jia-Jiun Hung, Taoyuan (TW); Hong-Jen Chang, Taoyuan (TW); Yen-Hsu Chiang, Taoyuan (TW); Yeou-Fuh Kuan, Taoyuan (TW); Char-Shin Miou, Taoyuan (TW)

(73) Assignee: Chunghwa Telecom Co., Ltd., Taoyuan (TW)

( * ) Notice: Subject to any disclaimer, the term of this patent is extended or adjusted under 35 U.S.C. 154(b) by 173 days.

(21) Appl. No.: 16/703,819

(22) Filed: Dec. 4, 2019

(65) Prior Publication Data
US 2020/0184061 A1 Jun. 11, 2020

(30) Foreign Application Priority Data

Dec. 7, 2018 (TW) .................................. 107144109

(51) Int. Cl.
*G06F 21/33* (2013.01)
*G06K 19/06* (2006.01)
(Continued)

(52) U.S. Cl.
CPC .............. *G06F 21/33* (2013.01); *G06F 21/34* (2013.01); *G06F 21/36* (2013.01); *G06K 19/06112* (2013.01)

(58) Field of Classification Search
CPC .......... G06F 21/33; G06F 21/34; G06F 21/36; G06F 19/06112
(Continued)

(56) References Cited

U.S. PATENT DOCUMENTS 7,062,471 B1 * 6/2006 Matsuyama ........... G06Q 20/04
705/64
9,147,191 B2 9/2015 Cohen et al.
(Continued)

FOREIGN PATENT DOCUMENTS

| CN | 1889123 | 1/2007 |
|---|---|---|
| TW | 201329873 | 7/2013 |

(Continued)

*Primary Examiner* — Jacob Lipman
(74) *Attorney, Agent, or Firm* — JCIPRNET

(57) ABSTRACT

The invention provides an identity authentication system and a method thereof. Embodiments of the invention provide application, installation, and verification processes of a mobile identification card, and enable a mobile apparatus of a user to be a carrier of the mobile identification card. The mobile identification card can be applied to services related to internal identification of enterprises, groups, or government agencies, and achieve smart and mobile identification. The mobile identification card is provided via an over-the-air mechanism. A mobile enterprise identification card service is provided to one or more enterprises by using a gateway. In addition, in combination with advantages of a dynamic graphics coding technology, a geographic location, data encryption with a key, transaction time recording, and other technologies, a graphic code can be generated for identity authentication. Therefore, highly secure identity authentication can be provided by using a dynamic graphic code.

10 Claims, 4 Drawing Sheets

(51) Int. Cl.
*G06F 21/36* (2013.01)
*G06F 21/34* (2013.01)

(58) Field of Classification Search
USPC .............................................. 726/4
See application file for complete search history.

(56) References Cited

U.S. PATENT DOCUMENTS

| | | | |
|---|---|---|---|
| 2013/0283397 A1* | 10/2013 | Griffin | H04W 4/50 |
| | | | 726/28 |
| 2017/0084097 A1 | 3/2017 | Janis | |
| 2017/0316626 A1* | 11/2017 | Smith | G07C 9/257 |
| 2017/0352053 A1 | 12/2017 | Heeter | |
| 2017/0364552 A1* | 12/2017 | Pattanaik | G06Q 20/389 |
| 2018/0026980 A1 | 1/2018 | Lee et al. | |
| 2018/0130025 A1 | 5/2018 | Kampouris et al. | |
| 2018/0278422 A1* | 9/2018 | Young | H04L 9/3247 |
| 2019/0058591 A1* | 2/2019 | Sharpe | H04L 9/3234 |

FOREIGN PATENT DOCUMENTS

| | | |
|---|---|---|
| TW | I529641 | 4/2016 |
| TW | I536293 | 6/2016 |
| TW | 201814606 | 4/2018 |

* cited by examiner

IDENTITY AUTHENTICATION SYSTEM AND METHOD THEREOF

CROSS-REFERENCE TO RELATED APPLICATION

This application claims the priority benefit of Taiwan application no. 107144109, filed on Dec. 7, 2018. The entirety of the above-mentioned patent application is hereby incorporated by reference herein and made a part of this specification.

BACKGROUND OF THE INVENTION

Field of the Invention

The disclosure relates to an identity authentication technology, and in particular, to an identity authentication system and a method thereof.

Description of Related Art

Tangible or intangible assets of enterprises are generally inaccessible to outsiders, thus requiring strict identity authentication to avoid theft by outsiders. In a conventional enterprise identification card technology, an identification card is mainly formed from a plastic card with a magnetic strip, a smart chip, text printing, etc., which requires certain card manufacturing costs. Currently, smart mobile apparatuses (for example, smartphones or tablet computers) are becoming basic objects in modern life. For example, a virtual mobile enterprise identification card may be installed on the mobile apparatus, which can achieve a cardless purpose and also facilitate card management and resolve the problem of the plastic card.

SUMMARY OF THE INVENTION

The invention provides an identity authentication system and a method thereof, where a mobile apparatus dynamically generates a graphic code, and identity authentication is enhanced in combination with a current location and a current time of a device, to ensure security of identification.

An embodiment of the invention provides an identity authentication system, including a mobile apparatus, an identity reading apparatus, and an identity authentication server. The mobile apparatus records issuer identification information, personal identification information, and a personal key, encodes the issuer identification information, the personal identification information, a current location of the mobile apparatus, and a first current time by using the personal key to generate identity data, converts the identity data into a graphic code, and displays the graphic code on a display screen. The identity reading apparatus scans the graphic code to obtain the identity data, and transfers the identity data, a current location of the identity reading apparatus, and a second current time. The personal key may be generated based on the personal identification information and an encryption/decryption master key corresponding to the issuer identification information. The identity data is decrypted based on the personal key to obtain the current location of the mobile apparatus and the first current time, and whether the identity data is valid is verified based on a difference between the current locations of the mobile apparatus and the identity reading apparatus and a difference between the first current time and the second current time.

An embodiment of the invention provides an identity authentication method, including the following steps: encoding issuer identification information, personal identification information, a first current location, and a first current time by using a personal key to generate identity data, converting the identity data into a graphic code, and displaying the graphic code; scanning the graphic code to obtain the identity data, and transferring the identity data, a second current location, and a second current time; generating the personal key based on the personal identification information and a corresponding encryption/decryption master key; decrypting the identity data based on the personal key to obtain the first current location and the first current time; and verifying whether the identity data is valid based on a difference between the first current location and the second current location and a difference between the first current time and the second current time.

Based on the above, in the identity authentication system and the method thereof in the embodiments of the invention, a secure and convenient dynamic graphical card issuing method is provided, and includes main processes such as application, installation, dynamic graphical card generation, and identity authentication. In the embodiments of the invention, a network service may be used to provide a graphical mobile identification card required by an issuer, so that an employee or a visitor of the issuer may use a mobile apparatus as an identification card carrier for the purpose of identity check related to identification and administrative processes required by internal activities of an enterprise. In addition, a highly secure dynamic mobile identification card is generated in combination with a graphics coding technology, geographic information, a time, data encrypted by using a key, and other technologies. After application and approval of a mobile enterprise identification card, a mobile enterprise identification card service can be implemented by using a mobile identification card application program on a mobile apparatus.

To make the foregoing features and advantages of the invention more comprehensible, specific embodiments are described below in detail with reference to accompanying drawings.

DESCRIPTION OF THE EMBODIMENTS

Figure 1:
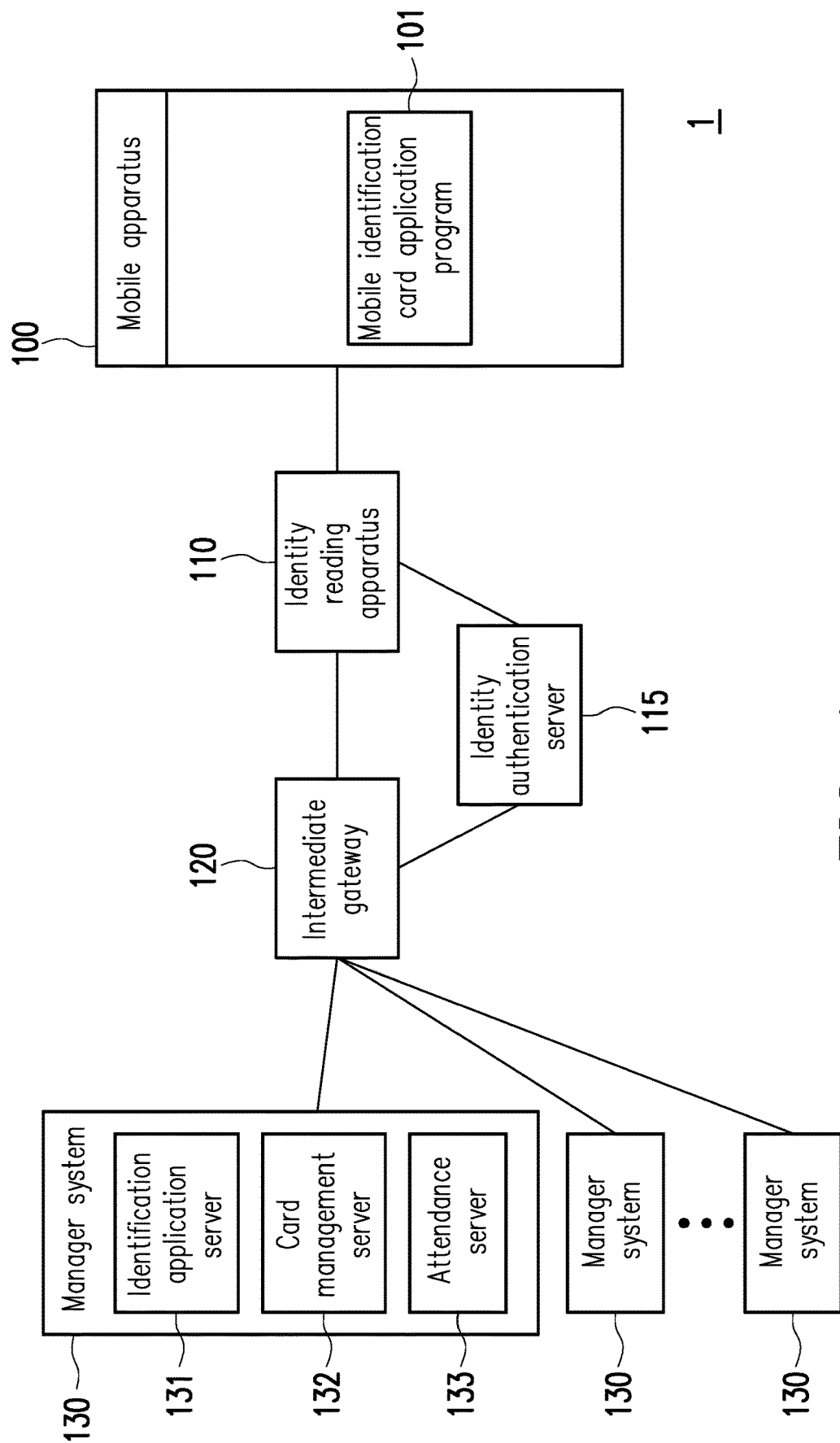
FIG. 1 is a schematic diagram of an identity authentication system according to an embodiment of the invention.

FIG. 1 is a schematic diagram of an identity authentication system 1 according to an embodiment of the invention. Referring to FIG. 1, the identity authentication system 1 includes, at least but not limited to, a mobile apparatus 100, an identity reading apparatus 110, an identity authentication server 115, an intermediate gateway 120, and one or more manager systems 130.

The mobile apparatus 100 may be a portable apparatus such as a smartphone, a tablet computer, or a palmtop game console, including at least a communication module (supporting mobile communication such as Wi-Fi, the third generation (3G), or a future generation), and a processor (for example, a CPU, a GPU, or an application-specific integrated circuit (ASIC)). The mobile apparatus 100 is loaded with and capable of running a mobile identification card application program 101 or other identification related software. The mobile identification card application program 101 includes a user interface (UI) to provide information related to identification card application, dynamic graphic code generation, display, query, verification, and the like.

The identity reading apparatus 110 may be any type of one-dimensional and/or two-dimensional barcode scanner, a camera, a card reader, a wireless communication receiver, or a combination thereof. In the present embodiment of the invention, the identity reading apparatus 110 may at least obtain, through image scanning, a graphic code formed by using a one-dimensional and/or two-dimensional barcode. In some embodiments, the identity reading apparatus 110 may wirelessly or wiredly read identity data recorded in an identity authentication carrier (which is not shown and is, for example, a smart card, a mobile phone, or a radio frequency identification (RFID) object). In addition, in some other embodiments, the identity reading apparatus 110 may be connected to access control, signing, or other identity authentication devices, and perform an operation such as opening or closing the door or signing in response to an authentication result, and may be automatically adjusted based on an actual need of a user.

The identity authentication server 115 may be an apparatus such as any type of server, a computer host, or a work station, and is connected to the identity reading apparatus 110. The intermediate gateway 120 may be an apparatus such as a gateway device, a routing device, or a computer host, and is connected to the identity authentication server 115.

The manager system 130 includes, at least but not limited to, an identification application server 131, a card management server 132, and an attendance server 133. The manager system 130 may be applied to institutions such as an enterprise, a company, a merchant, a government unit, a group, or a school. The application server 131, the card management server 132, and the attendance server 133 may be apparatuses such as any type of servers, computer hosts, or work stations, and detailed operations thereof are specifically described in the following embodiment. It should be noted that in the present embodiment, the intermediate gateway 120 functions as an intermediary, and is configured to interface the identity authentication server 115 and each independent manager system 130. In some embodiments, if serving only one manager system 130, the identity authentication server 115 may be directly interfaced to the manager system 130 without data forwarding by the intermediate gateway 120.

To facilitate understanding of operation processes in the present embodiment of the invention, the following describes in detail operation processes of the identity authentication system 1 in the present embodiment of the invention by using a number of embodiments. A method according to the embodiments of the invention is described below in combination with the apparatuses in the identity authentication system 1. Processes of the method according to the embodiments of the invention may be adjusted based on an implementation situation, and the invention is not limited thereto.

Figure 2:
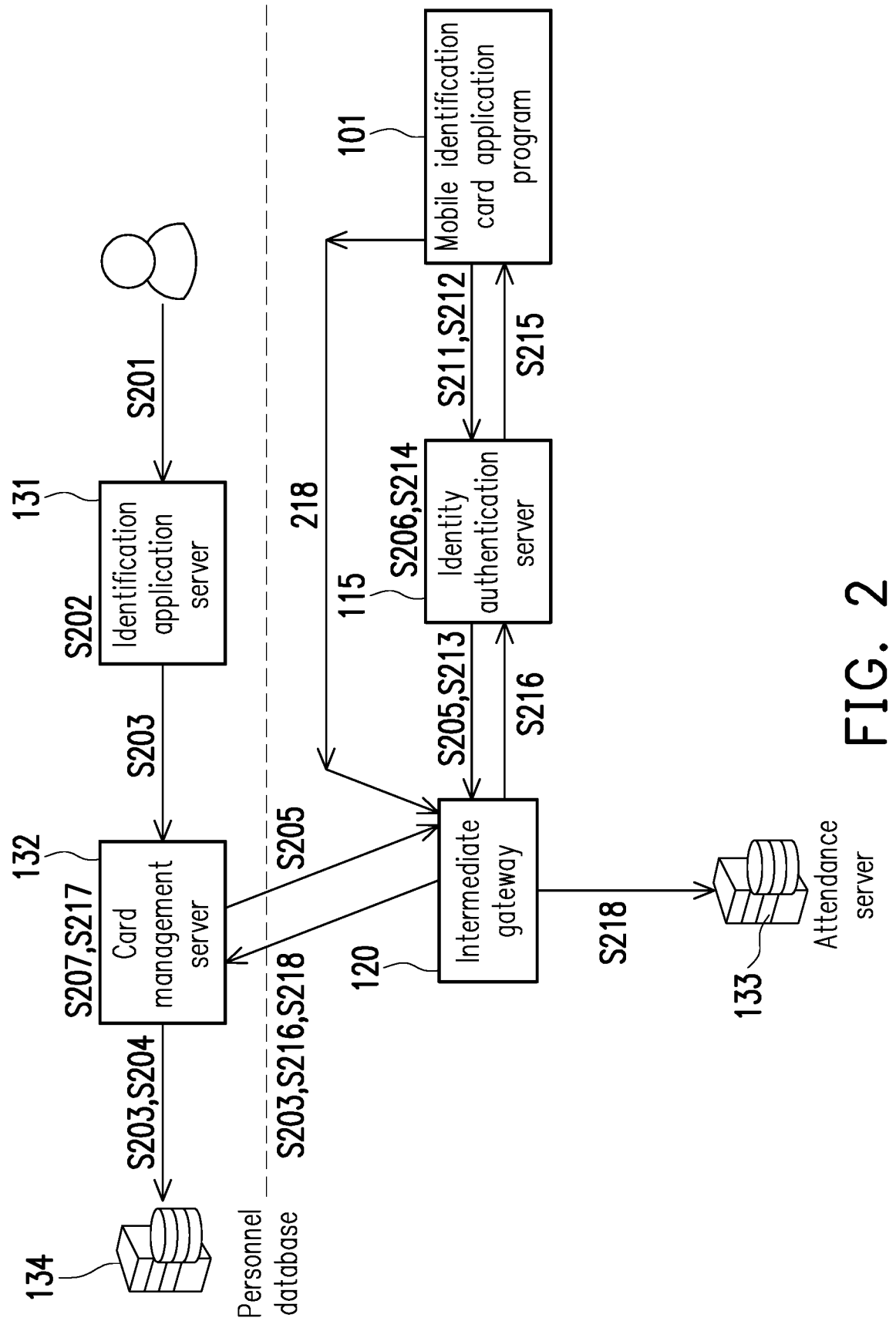
FIG. 2 is a flowchart of application and installation stages of an identity authentication method according to an embodiment of the invention.

FIG. 2 is a flowchart of application and installation stages of an identity authentication method according to an embodiment of the invention. Referring to FIG. 2, for an application process, it is prerequisite that a mobile identification card application program 101 needs to be installed on a mobile apparatus 100 at a user end in advance, and the mobile identification card application program 101 may run and generate different types of graphic codes such as a QR code or a universal product code. The mobile apparatus 100 or another networked apparatus receives a mobile identification card application operation (which may provide information such as personal identification information (for example, an employee number, an identity card number, or a passport number) and a phone number) triggered by a user in a web page electronic form or another UI, and the information related to the application operation is forwarded by an intermediate gateway 120 to an identification application server 131 of a corresponding manager system 130 through a network (step S201).

The identification application server 131 examines whether the information related to the application operation is permitted (for example, whether it involves a correct mobile identification card application program 101, a matched hardware device, and appropriate application specifications); if it is permitted, application data is checked; and if it is not permitted, rejection related information is returned (step S202). The identification application server 131 further sends the received information (for example, the employee number, the identity card number, or the mobile phone number) related to the application operation to a card management server 132 for check, and a personnel database 134 performs query and verification to determine whether the applicant is an internal member or a permitted member of an institution (that is, determine whether an application eligibility is met) (step S203).

If the information related to the application operation meets the application eligibility, the personnel database 134 provides corresponding employee or personnel identification card data (for example, card times and a photo) to the card management server 132, and the card management server 132 generates related identity data of a mobile enterprise identification card (step S204). The card management server 132 records or updates the identity data corresponding to the eligible applicant into an application completed whitelist, and provides the application completed whitelist to the intermediate gateway 120; and the intermediate gateway 120 forwards the application completed whitelist to the identity authentication server 115 (step S205).

The identity authentication server 115 may establish or update an approval whitelist based on the obtained application completed whitelist, and mark contact information (for example, the mobile phone number or a local number) corresponding to the applicant as that the mobile identification card of the specific institution can be issued thereto (step S206). The identity authentication server 115 further notifies the card management server 132 that the approval whitelist is established and the mobile identification card needs to be provided, and the card management server 132 may transfer an installation verification code to the mobile apparatus 100 or the networked apparatus through the network or an SMS message (step S207).

For the installation stage, the mobile identification card application program 101 running on the mobile apparatus 100 may provide a UI to receive an input operation of the user. For example, the user clicks "Add a mobile identification card" and enters the mobile phone number and/or other personal information. The personal information entered by the user is transferred to the identity authentication server 115, and the identity authentication server 115 may query based on the information whether the approval whitelist includes corresponding personal information (step S211). The identity authentication server 115 performs authentication by using, for example, the phone number of the mobile apparatus 100 or other personal information, to determine whether the mobile identification card can be provided (step S212). The identity authentication server 115 may obtain employee, member, or visitor identification card data (for example, issuer identification information and personal identification information) of the applicant from the corresponding card management server 132 by using the intermediate gateway 120 (step S213). The identity authentication server 115 converts the obtained identification card data into identity data (for example, issuer identification information, personal identification information, and a personal key) of the mobile identification card (step S214).

The identity authentication server 115 writes, to the mobile apparatus 100 in an over-the-air (OTA) manner, identity data related to the mobile identification card of the user triggering the application operation. The identity data related to the mobile identification card includes data such as the issuer identification information (cID for short below), the personal identification information (for example, an identification card identifier (uID for short below), personal information (for example, information such as a name and a birthday, cardinfo for short below), and/or the personal key (uK for short below) for use in subsequent mobile identification (step S215). The personal key (uK) in the mobile apparatus 100 is protected through encryption or by a secure element. The identity authentication server 115 may notify the intermediate gateway 120 of information that issuing of the mobile identification card is completed, so that the information is forwarded to the card management server 132 (step S216). After receiving issuing completed related information, the card management server 132 establishes or updates an issuing completed list based on the identity data corresponding to the user triggering the application operation (step S217).

The mobile identification card application program 101 may be connected to the intermediate gateway 120, and obtain, from the personnel database 134 or the attendance server 133 by using the intermediate gateway 120, explicit data (for example, an attendance record or asset information) of the mobile identification card that can be presented in the UI (step S218). So far, the installation stage is completed.

It should be noted that, after completion of the application and installation stages, the embodiments of the invention further provide online and offline verification modes, which are described below in detail.

Figure 3:
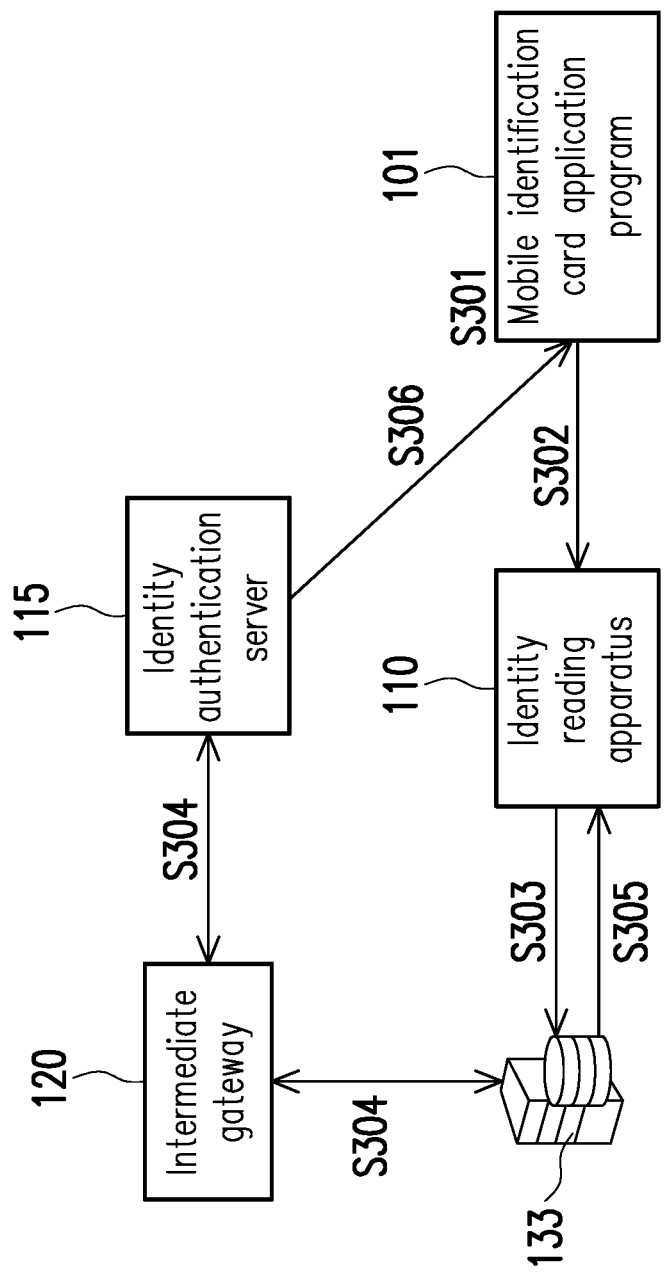
FIG. 3 is a flowchart of an online verification stage of an identity authentication method according to an embodiment of the invention.

FIG. 3 is a flowchart of an online verification stage of an identity authentication method according to an embodiment of the invention. Referring to FIG. 3, after the application and installation stages in the foregoing embodiment of FIG. 2, the identity authentication server 115 may record information for each user as shown in Table (1):

TABLE (1)

| | |
|---|---|
| Issuer identification information | cID, encryption/decryption master key (cMK for short below) |
| Identity reading apparatus information | cID, identifier (rID for short below) of identity reading apparatus, current location (rGPS for short below) of identity reading apparatus |
| Approval whitelist information | cID, approval whitelist |
| Identity data related to mobile identification card | cID, uID, cardInfo |

The identity reading apparatus 110 records information as shown in Table (2):

TABLE (2)

| | |
|---|---|
| Identity reading apparatus information | rID, rGPS |

In addition, the mobile identification card application program 101 records information as shown in Table (3):

TABLE (3)

| | |
|---|---|
| Issuer identification information | cID |
| Identity data related to mobile identification card | uID |
| | uK |
| | cardInfo |

The following provides a description in combination with a use scenario. For the sake of security, a graphic code used by the mobile identification card application program 101 for mobile identification is of one-time use. Each graphic code used in identity authentication is valid once. Therefore, before each card swipe at the identity reading apparatus 110, the user needs to dynamically generate a new graphic code for identification by using the mobile identification card application program 101 (step S301). For example, the mobile identification card application program 101 encodes and encrypts, by using the personal key (uK), the issuer identification information (cID), the personal identification information (for example, uID and cardinfo), a current location (uGPS for short below) of the mobile apparatus 100, and a current time (uTime for short below) of generation to generate identity data (for example, [cID, uID, uGPS, uTime, cardInfo]uK, cID', uID'], where cID=cID' and uID=uID'), and convert the identity data into a graphic code (for example, a QR code or other one-dimensional and/or two-dimensional barcodes), to display the graphic code on a display screen of the mobile apparatus 100.

The user may put the mobile apparatus 100 displaying the graphic code close to the identity reading apparatus 110, so that the identity reading apparatus 110 may scan the graphic code to obtain the corresponding identity data, and transfer, to the identity authentication server 115, the personal identification information (for example, [cID, uID, uGPS, uTime, cardInfo]uK, cID', uID']) in the identity data, the current location (rGPS) and the identifier (rID) of the identity reading apparatus 110, and a current time (rTime for short below) at which the identity reading apparatus 110 scans the graphic code (step S302).

The identity authentication server 115 may perform verification after receiving the identity data and related data of the identity reading apparatus 110 that are transferred by the identity reading apparatus 110 (step S303). For example, the identity authentication server 115 may find a corresponding encryption/decryption master key (cMK) from the database based on the received issuer identification information (for example, cID'), and generate a personal key (uK) in combination with the personal identification information (in other words, uK may be obtained based on a combination of cMK and uID'). Further, the identity authentication server 115 may decrypt, by using the generated personal key (uK), the identity data carried by the graphic code to obtain the current location (uGPS) and the current time (uTime) of the mobile apparatus 100, the personal identification information (uID and cardInfo), and the issuer identification information (cID) (in other words, cID, uID, uGPS, uTime, and cardInfo may be obtained by decoding the encoded identity data by using uK). The identity authentication server 115 verifies whether the decoded identity data is valid, for example, verifying whether the issuer identification information (uID) after decryption are the same as the issuer identification information (cID') and the personal identification information (uID') that are unencrypted, and determining whether a difference between the current times (uTime and rTime) of the mobile apparatus 100 and the identity reading apparatus 110 is (for example, less than a valid secure time (for example, 1 minute or 30 seconds)), and whether a difference between the two current locations (uGPS and rGPS) is (for example, less than a valid secure range (for example, within 500 meters or 100 meters)). When the one-time graphic code is generated for verification, a current transaction record hash value needs to be compared with all previous transaction records (for example, hash values), to determine that the identity data submitted by the mobile identification card is not used repeatedly but used one time.

If the mobile identification card is successfully verified by the identity authentication server 115, information [cID, uID, rID, rTime, cardInfo] is recorded into a card swipe record, and a hash value of each transaction record is recorded (step S304). The identity authentication server 115 may notify the identity reading apparatus 110 that the identity data is valid and is verified, and send corresponding identification card data (step S305), and the card swipe record may be forwarded by the intermediate gateway 120 to a corresponding attendance server 133. After receiving card swipe success information, the identity reading apparatus 110 correspondingly needs to open the door (as an access control card machine) or display a card swipe success (as an attendance card machine), and/or display other necessary identification information (step S306).

Figure 4:
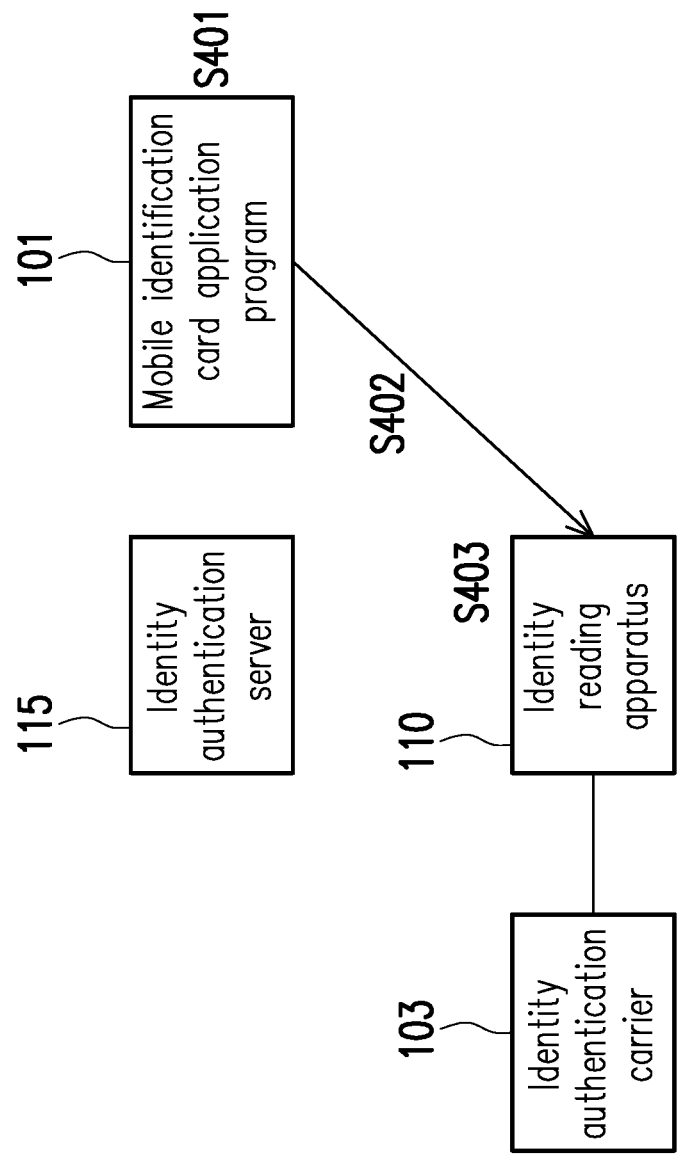
FIG. 4 is a flowchart of an offline verification stage of an identity authentication method according to an embodiment of the invention.

FIG. 4 is a flowchart of an offline verification stage of an identity authentication method according to an embodiment of the invention. Referring to FIG. 4, after the application and installation stages in the foregoing embodiment of FIG. 2, the identity authentication server 115 may record information for each user as shown in Table (1), and the identity reading apparatus 110 records information as shown in Table (2).

For offline verification, the identity reading apparatus 110 needs to cooperate with an identity authentication carrier 103 (for example, a secure access module (SAM), a smart card, a magnetic stripe card, a chip card, or an RFID object). Issuer identification information (cID) and a corresponding encryption/decryption master key (cMK) are written to the identity authentication carrier 103 to decrypt an encrypted identity data part. In this way, verification of the identity authentication server 115 is unnecessary. In addition, the mobile identification card application program 101 records information as shown in Table (3).

The following provides a description in combination with a use scenario. The mobile identification card application program 101 first generates a new graphic code as in step S301, and the graphic code carries an identity data part encrypted by using a personal key (uK) and an unencrypted identity data part (step S401). The user may put the mobile apparatus 100 displaying the graphic code close to the identity reading apparatus 110, so that the identity reading apparatus 110 may scan the graphic code to obtain corresponding identity data, and a current location (rGPS) and an identifier (rID) of the identity reading apparatus 110, and a current time (rTime) at which the identity reading apparatus 110 scans the graphic code are recorded (step S402). The user may provide in step S402 the mobile apparatus 100 presenting the graphic code for reading by the identity reading apparatus 110 to obtain personal identification information (cID' and uID').

The identity reading apparatus 110 may perform verification after receiving the identity data and obtaining related data of the identity reading apparatus 110 (step S403). For example, the identity reading apparatus 110 may obtain an encryption/decryption master key (cMK) that is recorded in the identity authentication carrier 103 and corresponding to issuer identification information (for example, cID') carried by the graphic code, and generate a personal key (uK) based on the received personal identification information (for example, uID') and the encryption/decryption master key (cMK) corresponding to the issuer identification information (for example, cID'). Further, the identity reading apparatus 110 may decrypt, by using the generated personal key (uK), the identity data carried by the graphic code to obtain the current location (uGPS) and the current time (uTime) of the mobile apparatus 100, the personal identification information (uID and cardInfo), and the issuer identification information (cID). The identity reading apparatus 110 verifies whether the decoded identity data is valid, for example, verifying whether the issuer identification information (cID) and the personal identification information (uID) after decryption are the same as the issuer identification information (cID') and the personal identification information (uID') that are unencrypted, and determining whether a difference between the current locations (uGPS and rGPS) of the mobile apparatus 100 and the identity reading apparatus 110 is (for example, less than a valid secure range (for example, within 500 meters or 100 meters)), and whether a difference between the two current times (uTime and rTime) is (for example, less than a valid secure time (for example, 1 minute or 30 seconds)).

If the mobile identification card is successfully verified by the identity reading apparatus 110, the identity reading apparatus 110 records information [cID, uID, rID, rTime, cardInfo] into a card swipe record. In addition, the identity reading apparatus 110 correspondingly needs to open the door (as an access control card machine) or display a card swipe success (as an attendance card machine), and/or display other necessary identification information.

Based on the above, in the identity authentication system and the method thereof in the embodiments of the invention, a secure and convenient dynamic graphical card issuing method is provided, and includes main processes such as application, installation, dynamic graphical card generation, and identity authentication. With a graphic code generation mechanism that provides a highly secure mobile enterprise identification card, it is ensured that only an authorized identity reading apparatus can scan and analyze identity data carried by a graphic code. The embodiments of the invention allow an enterprise employee/visitor user to apply for, download, and install a mobile identification card by using a mobile apparatus. The user may dynamically update a graphic code of the highly secure mobile identification card by using a mobile identification card application program of the mobile apparatus. Since a data encryption mechanism and a geographic information and transaction time check mechanism are used, mobile identification provided in the embodiments of the invention is suitable for use in an enterprise with confidentiality and security requirements.

In the embodiments of the invention, a unique personal key is used for encryption to generate encrypted identity data, which can ensure that a problem that a to-be-authenticated identity can be read by simply scanning a graphic code is avoided, and only an authorized authentication device or system can generate a decryption key to decrypt to-be-verified identity data.

In the embodiments of the invention, company identification information and user identification information of a mobile identification card, identification card information, and geographic information and time factors of a mobile apparatus during card swipe are encrypted by using a unique personal key to generate encrypted identity data. Therefore, in addition to a need to perform decryption to verify the company identification information, the user identification information, and the identification card information, a verification end further needs to perform comparison to determine whether a current location and time of the mobile apparatus during card swipe of the mobile identification card meets a specified security condition, to determine whether the card swipe behavior is valid. Such a strict process is mainly to avoid a problem that a graphic code is stolen for fraudulent use.

The embodiments of the invention provide online and offline verification modes. For online verification, after scanning a graphic code of a mobile identification card, an identity reading apparatus of an enterprise immediately analyzes to-be-verified identity data. Further, the identity reading apparatus transfers encrypted identity data together with related data (for example, an identifier, a current location, and a scan time) of the identity reading apparatus to a backend system through a network, to perform an identification card identity authentication procedure. For offline verification, an identity reading apparatus may cooperate with an identity authentication carrier (company identification information and an encryption/decryption master key (cMK) corresponding to the company identification information are written to the identity authentication carrier in advance) to scan a graphic code of a mobile identification card and analyze to-be-verified identity data. Further, the identity reading apparatus works out a personal key for decryption based on the identity data and content of the corresponding encryption/decryption master key (cMK) recorded in the identity authentication carrier, to perform a subsequent identification card identity authentication procedure based on the personal key.

The mobile identification card provided in the embodiments of the invention is valid one time. In other words, once a transaction is verified, the graphic code of the mobile identification card installed on the mobile apparatus is invalid. Therefore, when using the mobile identification card next time, the user needs to update the graphic code of the mobile identification card by using a corresponding application program, and use a new graphic code for identity authentication. Otherwise, it is determined as invalid.

Although the invention has been disclosed above by using the embodiments, it is not intended to limit the invention. Any person of ordinary skill in the art can make some changes and modifications without departing from the spirit and scope of the invention. Therefore, the protection scope of the invention shall be subject to the appended claims.

What is claimed is:

1. An identity authentication system, comprising:
   a mobile apparatus, transmitting personal information to receive issuer identification information, personal identification information related to the personal information, and a personal key of the mobile apparatus, recording the issuer identification information, the personal identification information, and the personal key of the mobile apparatus, encrypting all of the issuer identification information, the personal identification information, a current location of the mobile apparatus, and a first current time by using merely the personal key of, the mobile apparatus to generate identity data, converting the identity data into a graphic code, and displaying the graphic code on a display screen, wherein a hash value of a current transaction record is compared with at least one previous transaction record in response to the graphic code being generated, to ensure the graphic code is one-time use; and
   an identity reading apparatus, scanning the graphic code to obtain the identity data, and transferring the identity data, a current location of the identity reading apparatus, and a second current time, wherein
      the personal key of the mobile apparatus is generated based on the personal identification information and an encryption/decryption master key corresponding to the issuer identification information, the identity data is decrypted based on the personal key of the mobile apparatus to obtain the current location of the mobile apparatus and the first current time, and whether the identity data is valid is verified based on a difference between the current locations of the mobile apparatus and the identity reading apparatus and a difference between the first current time and the second current time, wherein the current transaction record is recorded as one of the at least one previous transaction record and the graphic code corresponding to the current transaction is invalid in response to the identity data being valid.

2. The identity authentication system according to claim 1, wherein the identity data further comprises the issuer identification information and the personal identification information which are unencrypted, and it is further determined whether the issuer identification information and the personal identification information after decryption are the same as the issuer identification information and the personal identification information which are unencrypted, to verify whether the identity data is valid.

3. The identity authentication system according to claim 1, further comprising:
   an identity authentication carrier, recording the issuer identification information and the encryption/decryption master key corresponding to the issuer identification information, wherein the identity reading apparatus generates the personal key based on the personal identification information and the obtained encryption/decryption master key corresponding to the issuer identification information recorded in the identity authentication carrier; or
   an identity authentication server, obtaining the encryption/decryption master key from a database based on the issuer identification information, and generating the personal key based on the personal identification information and the encryption/decryption master key.

4. The identity authentication system according to claim 1, further comprising:
   an identification application server, receiving an application operation sent by the mobile apparatus through a network, and writing the issuer identification information, the personal identification information, and the personal key in the identity data corresponding to the application operation to the mobile apparatus in an over-the-air manner; and an attendance server, recording the issuer identification information, the personal identification information, identification information of the identity reading apparatus, and the second current time into a card swipe record corresponding to the personal identification information in response to the identity data being valid.

5. The identity authentication system according to claim 4, further comprising:
a plurality of manager systems, wherein each of the manager systems comprises at least one of the identification application server and the attendance server; and
an intermediate gateway, forwarding data from an identity authentication server to one of the manager systems.

6. An identity authentication method, comprising:
transmitting personal information to receive issuer identification information, personal identification information related to the personal information, and a personal key of a mobile apparatus;
encrypting all of the issuer identification information, personal identification information, a first current location, and a first current time by using merely the personal key of the mobile apparatus to generate identity data, converting the identity data into a graphic code, and displaying the graphic code, wherein a hash value of a current transaction record is compared with at least one previous transaction record in response to the graphic code being generated, to ensure the graphic code is one-time use;
scanning the graphic code to obtain the identity data, and transferring the identity data, a second current location, and a second current time;
generating the personal key of the mobile apparatus based on the personal identification information and a corresponding encryption/decryption master key;
decrypting the identity data based on the personal key of the mobile apparatus to obtain the first current location and the first current time; and
verifying whether the identity data is valid based on a difference between the first current location and the second current location and a difference between the first current time and the second current time, wherein the current transaction record is recorded as one of the at least one previous transaction record and the graphic code corresponding to the current transaction is invalid in response to the identity data being valid.

7. The identity authentication method according to claim 6, wherein the identity data further comprises the issuer identification information and the personal identification information which are unencrypted, and the step of verifying whether the identity data is valid further comprises:
determining whether the issuer identification information and the personal identification information after decryption are the same as the issuer identification information and the personal identification information which are unencrypted, to verify whether the identity data is valid.

8. The identity authentication method according to claim 6, wherein the step of scanning the graphic code to obtain the identity data comprises:
generating the encryption/decryption master key by using an identity authentication carrier, and the step of decrypting the identity data based on the personal key comprises:
generating the personal key based on the personal identification information and the encryption/decryption master key corresponding to the issuer identification information recorded in the identity authentication carrier.

9. The identity authentication method according to claim 6, wherein before the step of generating the identity data, the method further comprises:
receiving an application operation sent through a network; and
writing the issuer identification information, the personal identification information, and the personal key in the identity data corresponding to the application operation in an over-the-air manner, and after the step of verifying whether the identity data is valid, the method comprises:
recording the issuer identification information, the personal identification information, identification information of an identity reading apparatus, and the second current time into a card swipe record corresponding to the personal identification information in response to the identity data being valid.

10. The identity authentication method according to claim 6, further comprising:
forwarding a verification result of the identity data to a corresponding manager system by an intermediate gateway.

* * * * *